May 21, 1963
T. R. KOMLINE ETAL
3,090,488
FILTER BELT REGULATING MEANS AND PROCESS
Filed March 15, 1960
8 Sheets-Sheet 1
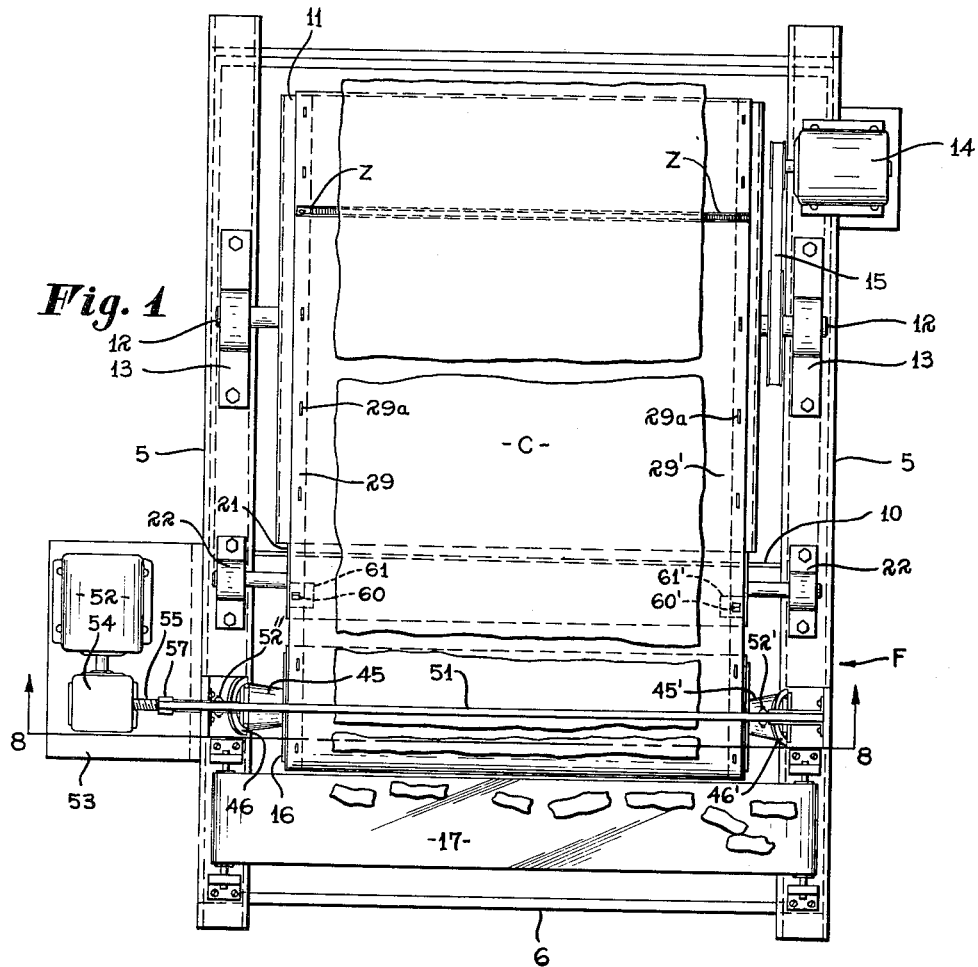
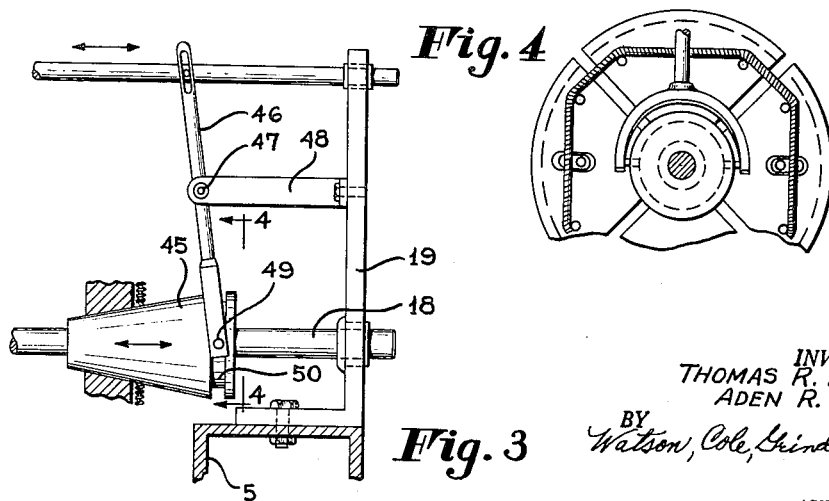
INVENTORS
THOMAS R. KOMLINE
ADEN R. SIRLES
BY Watson, Cole, Grindle & Watson
ATTORNEYS May 21, 1963  T. R. KOMLINE ETAL  3,090,488
FILTER BELT REGULATING MEANS AND PROCESS
Filed March 15, 1960  8 Sheets-Sheet 2

INVENTORS
THOMAS R. KOMLINE
ADEN R. SIRLES
BY
Watson, Cole, Grindle & Watson
ATTORNEYS May 21, 1963 T. R. KOMLINE ETAL 3,090,488
FILTER BELT REGULATING MEANS AND PROCESS
Filed March 15, 1960 8 Sheets-Sheet 3
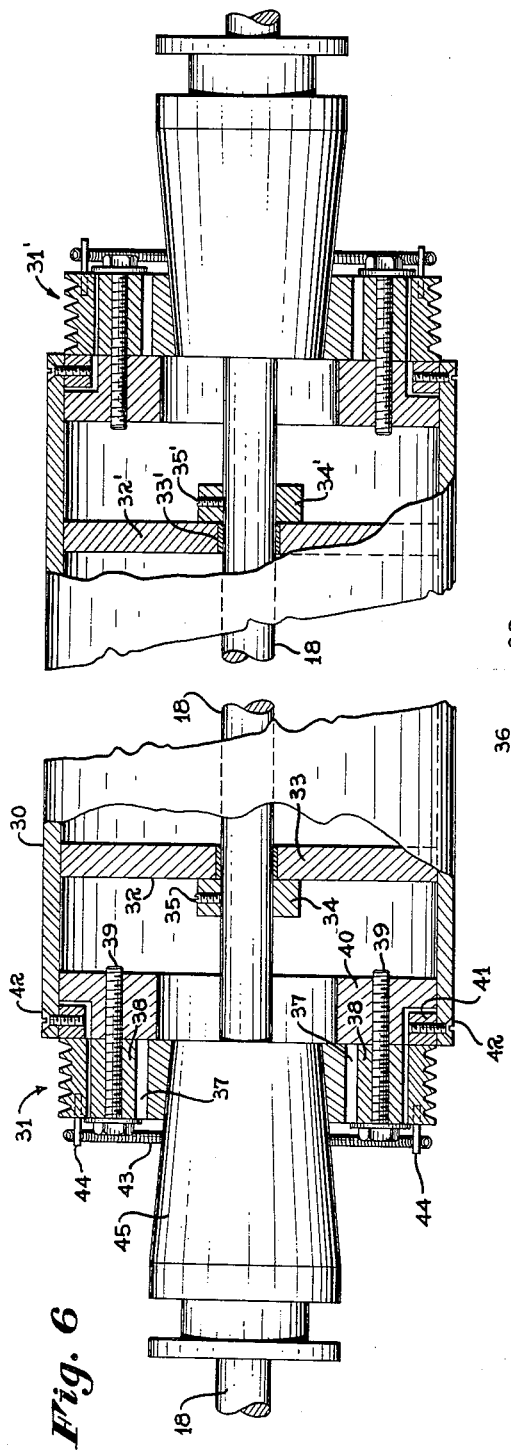
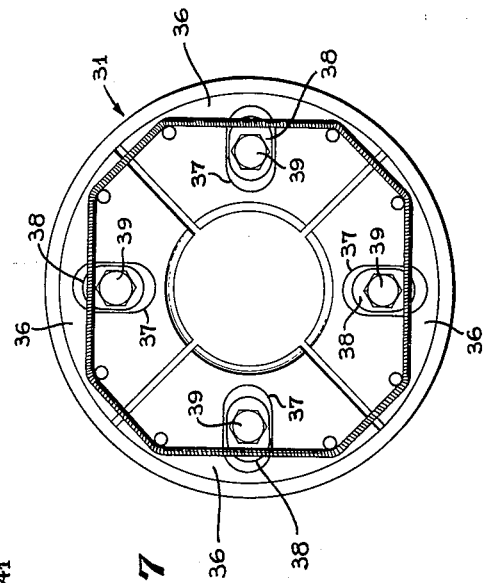
INVENTORS
THOMAS R. KOMLINE
ADEN R. SIRLES
BY Watson, Cole, Grindle & Watson
ATTORNEYS

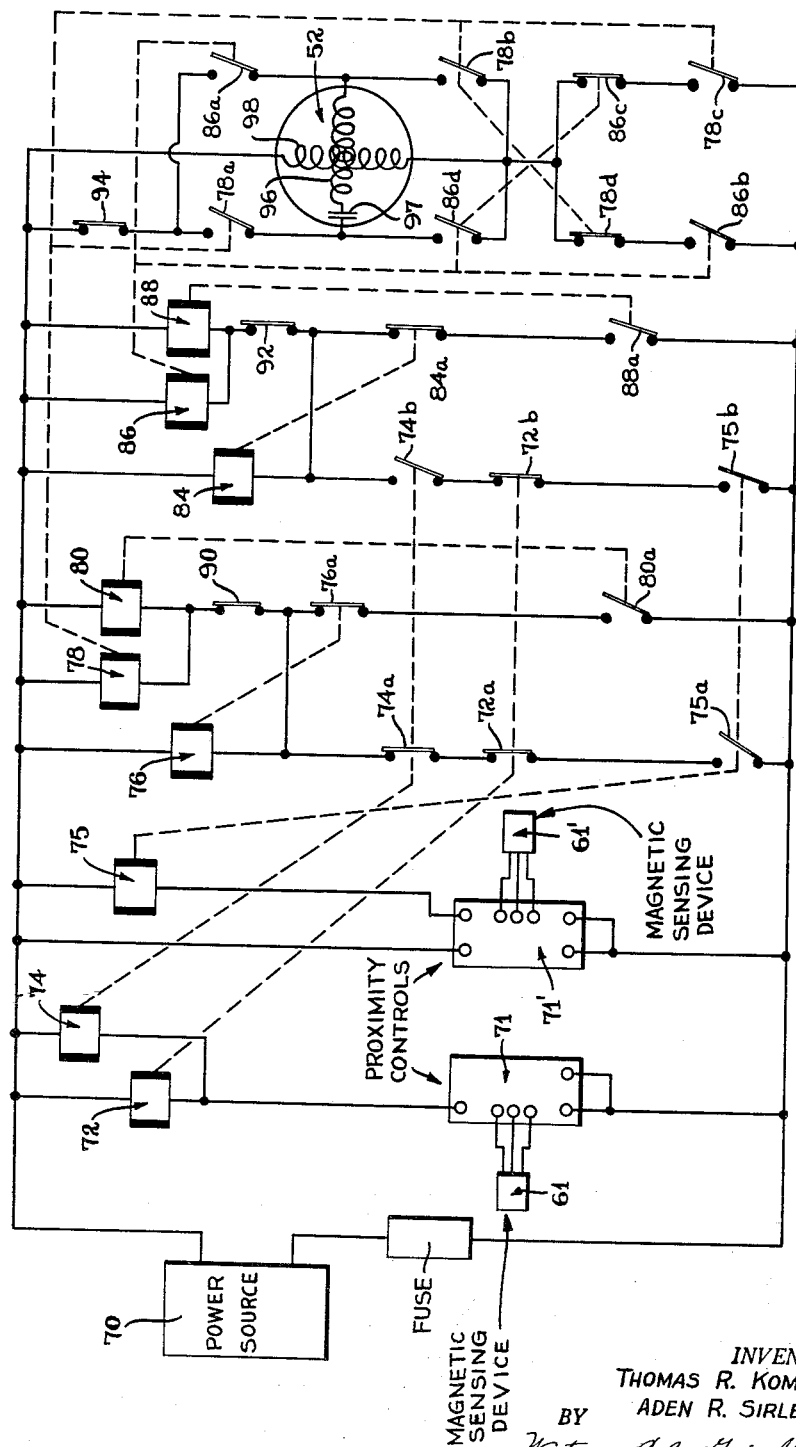

INVENTORS
THOMAS R. KOMLINE
ADEN R. SIRLES
BY Watson, Cole, Grindle & Watson
ATTORNEYS May 21, 1963 T. R. KOMLINE ETAL 3,090,488
FILTER BELT REGULATING MEANS AND PROCESS
Filed March 15, 1960 8 Sheets-Sheet 8

INVENTORS.
THOMAS R. KOMLINE
ADEN R. SIRLES
BY
Watson, Cole, Grindle &
Watson
ATTORNEYS

United States Patent Office 3,090,488
Patented May 21, 1963

3,090,488
FILTER BELT REGULATING MEANS AND PROCESS
Thomas R. Komline, Gladstone, and Aden R. Sirles, Mendham, N.J., assignors to Komline-Sanderson Engineering Corporation, a corporation of New Jersey
Filed Mar. 15, 1960, Ser. No. 15,199
11 Claims. (Cl. 210—77)

This invention relates to improvements in a filter unit of the class which employs a belt type moving filter media and, more particularly, to means for maintaining the said filter media in substantially wrinkle-free condition and in proper alignment with respect to the rolls and or drum around which it is supported and guided.

In filter units of the class here involved, the filter belt normally is of very substantial width; it moves through its circuit necessarily at a quite low rate of speed; and it is in many cases of a quite thin, highly flexible and deformable or stretchable nature.

It has been heretofore known to provide the edge portions of such a filter belt with longitudinal belt or rib defining means received and guided in annular grooves around the filter drum and its associated rolls, as in the U.S. patent to Clark, No. 877,631, granted January 28, 1908.

Even though the opposite side edges of the filter belt are thus positively guided in their movement, it has been found in actual practice that various portions of the belt spaced transversely from each other may gradually be displaced relative to each other in the direction of the belt movement. This applies particularly to the opposite side edge portions of the belt, though not necessarily restricted thereto. The net result is that the belt is deformed and wrinkled diagonally, and the deformation, if permitted to proceed far enough, may even pull the edge guides or ribs, as aforementioned, out of their guide grooves and or cause a tearing or separation of the filter media from them. Moreover, the wrinkles themselves are inherently harmful, and it is well recognized in the art that they reduce the useful life of a filter media in which they occur and the efficiency of the entire filter unit and, in addition, may, by premature failure, cause costly shutdowns of the filter unit.

It will be clearly apparent that usual belt aligning mechanisms, wherein means is provided for automatically detecting and correcting actual sidewise displacement of the belt in its entirety, offer no adequate solution for the problem outlined in the preceding paragraph, which consists essentially in the relative displacement of different transverse portions of the same belt or band, rather than in merely sidewise displacement of the entire band.

However, it has been found in actual practice that, where normally transversely aligned points on the opposite side edges of the belt, or at other transversely spaced positions symmetrical to the belt center line, can be maintained in proper transverse alignment within a relatively small degree of tolerance, this will also substantially eliminate the usual causes of misalignment of the belt and will substantially eliminate the tendency toward wrinkling of the belt.

The present inventive concept therefore is based on the discovery that, by preventing any appreciable relative displacement in the direction of belt movement of normally transversely aligned portions of the belt, the belt can be maintained in generally wrinkle-free condition, and the accuracy of its tracking greatly improved.

With this discovery in mind, it has been found in actual practice that such relative displacement of normally transversely aligned portions of the belt may be corrected by utilizing a belt which is resiliently stretchable and in which all transverse areas across the belt are driven, as is usual, at the same velocity, as through driven engagement with a driven rotary filter drum or the like. Any relative displacement which may then occur, as between such normally relatively transversely aligned belt portions may be counteracted by relatively varying the lengths of the endless circuits traversed by these portions. It will be readily appreciated that, due to the equal velocities of these portions, such relative variations in the lengths of their respective circuits, changes the times required for completion of the respective circuits and therefore may be utilized to adjust the comparative positions of these portions in their respective circuits as desired. This in substance is the basic inventive concept here involved.

The variation in the lengths of the respective circuits may comprise any means engaging the respective transversely spaced belt portions and adjustable either to locally deflect them to the desired extent away from the paths which they would otherwise pursue, or to permit their return toward such paths. Such means is exemplified in the instant disclosure, either by coaxial variable diameter pulleys or roll sections operatively engaging the respective belt portions, or in a preferred arrangement, by a freely rotatable roll operatively engaging the belt and swiveled for angular movement about an axis generally perpendicular to its axis of rotation.

The elastically stretchable belt may comprise merely a porous resiliently stretchable web of rubber or other resilient material, though in its preferred embodiment it is of composite structure comprising an inelastic but stretchable filter cloth web, along the opposite side edges of which are secured elastic belts or bands, which, in addition to defining the belt edges, impart elasticity thereto. Moreover, such elastic edges serve to reinforce the belt and may advantageously cooperate with pulleys, sheaves, or the like, to limit axial displacement of the belt.

In accordance with one feature of the invention, the belt itself is provided with a pair of reference elements or indicia spaced transversely relative to each other, which may advantageously be carried by the resilient belt edges. These elements are normally adapted to move past predetermined observation points simultaneously when the belt itself is in its proper undeformed state. The said elements or indicia are periodically observed and their positions compared during movement of the belt through its endless circuit, and when it is noted that one such reference element has become advanced or retarded relative to the other in the direction of movement, the relative lengths of the endless circuits through which the elements travel are varied as above mentioned, to cause the two reference points or indicia to return toward their proper relative positions. Suitable visual indicia or reference points for this purpose of the invention may comprise simply the end portions of the usual transverse seam joining together the ends of the web. Such a seam, being substantially liquid-impervious, will not be coated or obscured by the filter cake.

The invention includes the process of so regulating the filter belt movement, as well as the combination of the resiliently stretchable belt and its said reference elements with means for sensing or detecting relative displacements of the reference elements.

It further includes the combination with the band and such sensing means, of mechanism actuated by the sensing means for retarding or advancing the cyclic movement of one of the reference points or elements in the belt relative to the other, as required to maintain them at all times in their proper relative positions within a predetermined small range of tolerance.

Obviously, the various individual elements and instrumentalities for practicing the invention may assume various forms, but for the purpose of exemplification, there are shown two specific embodiments of the invention in the accompanying drawings, in which:

FIGURE 1 represents a plan view of a drum type endless belt vacuum filtering unit incorporating the substance of the invention;

FIGURE 3 is an enlarged fragmentary view partly in section, illustrating diagrammatically the mechanism for varying the diameter of one of the variable diameter sections of the roll;

FIGURE 4 is a detail section on the line 4—4 of FIGURE 3;

FIGURE 6 is an enlarged detail view, partly in elevation and partly in section, of the discharge roll with its variable diameter sections;

FIGURE 7 is an enlarged detail end elevation of one of the variable diameter roll sections;

FIGURES 9 and 9A are a circuit diagram of the electrical means for detecting the advancing or retarding of the various transverse portions of the belt relative to each other and automatically varying the diameter of the variable diameter roll section to compensate therefor;

Figure 2:
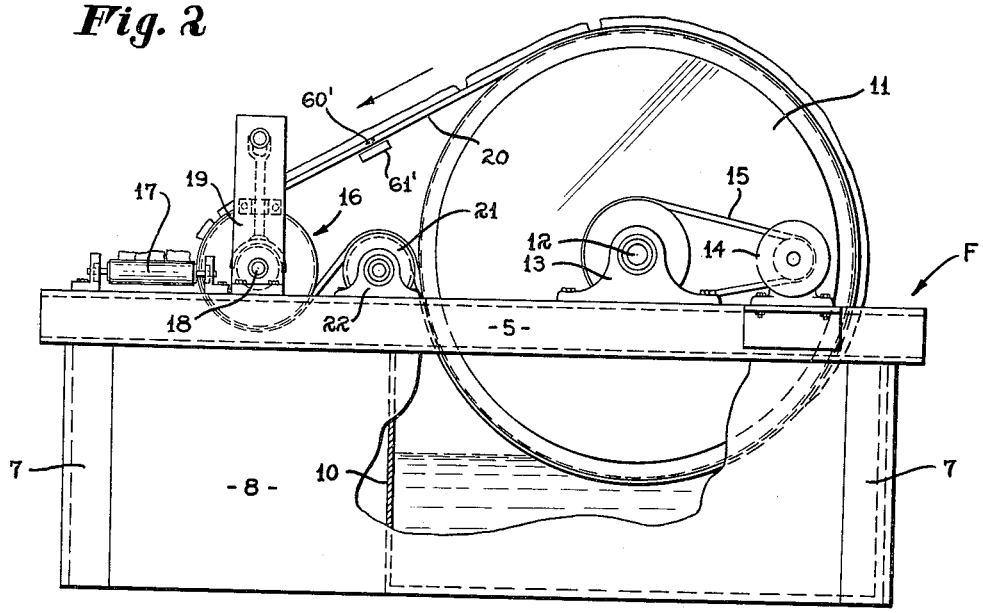
FIGURE 2 is a side elevation of the mechanism shown in FIGURE 1.

Referring now in detail to the accompanying drawings, the filter unit shown in its entirety in FIGURES 1 and 2 is conventional as to its general organization of elements.

The various functional components of the filter structure are supported on a conventional rigid frame, generally designated F. This frame is of rectangular shape in plan, including rigidly interconnected sides 5—5, and ends 6—6, plus the depending supporting legs or standards 7, the legs being interconnected on sides of the frame, if desired, by vertical sheet metal walls 8. This structure comprises a usual upwardly opening filter tank 10 adapted for containing a supply of the liquid and solid mixture to be subjected to the filtering action. Mounted for rotation about a horizontal axis across this tank 10 is a filter drum 11, having its lower portion immersed in the liquid contents of the tank in usual manner. This drum has its usual supporting stub axles or trunnions 12 rotatably journaled in bearings 13 on the opposite sides 2 of the frame F. Normally the drum 11 is rotated at a constant speed, as for example, by means of the motor 14, the output shaft of which is in driving relation with one of the drum trunnions through a usual flexible drive 15.

Disposed in horizontally spaced axially parallel relation to the drum 11 is a further roll 16, which in the present embodiment of the invention, serves as the discharge roll, it being understood that, in accordance with usual practice, the filter cake C formed on the web of the filter belt, hereinafter described, will be discharged onto a usual conveyer 17 or elsewhere as the belt passes around said roll before returning to the drum. The discharge roll 16 is supported for rotation about an axis parallel to that of the drum 11, by means of its shaft 18, which is supported in standards 19 on opposite sides 2—2 of frame F.

A filter belt, designated 20 in its entirety, is composed of a porous stretchable fabric web 20', having elastic edges 29, 29'. The belt 20 is supported and guided about the drum 11 and the roll 16, so that it may be driven through an endless circuit incident to the rotation of the drum. It is, moreover, desirable to provide a return roll 21, the shaft of which is supported at its opposite ends by bearings 22, respectively, for rotation about an axis parallel to the drum. Roll 21, which is located between the drum 11 and roll 16, presses upwardly against the under and outer surface of the band and serves to maintain a greater portion of the belt around the drum 11 and in operative engagement therewith than would be the case were the belt merely run directly from the roll 16 back on to the drum 11.

The foregoing general organization of elements is conventional and operates in usual manner. The belt 20 is moved through the liquid contents of the tank 10 by rotation of the drum. By means of suitable suction fittings and valve means on the drum, but constituting no part of this invention, and therefore not shown, there is produced a subatmospheric pressure in the space between the drum and the inner surface of the filter web 20'. Because of this, the unbalance of pressures on opposite sides of the web will urge a liquid filtrate through the pores of the web and into the filtrate space 23, which is shown fragmentarily in FIGURE 5 of the drawing. In order to properly maintain this space, there is provided a usual filter deck composed of upward projections 24, fixed on the surface of the drum and permitting free flow of filtrate to suitable suction connections not shown. Suitable sealing means are provided, including annular edge seals, such as 26, which are disposed around the drum for sealing engagement with the inner surface of the filter web 20' for usual purposes, as will be readily appreciated by those skilled in the art.

Figure 5:
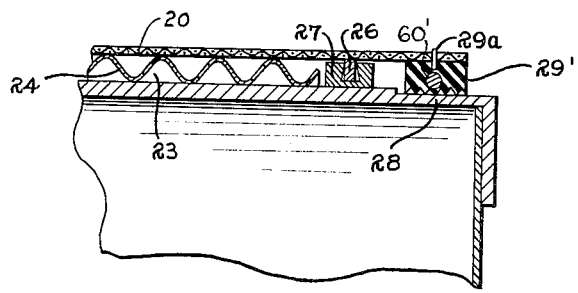
FIGURE 5 is a fragmentary diametrical section through the filter drum and belt to show certain details of the construction thereof.

It should be noted that the sealing strips 26 as shown in FIGURE 5 are mounted in annular channeled members 27, which encircle the drum adjacent its opposite ends. The ends of the drum 28 function as end flanges or extensions of the drum, around which the elastic edges, defined by resiliently stretchable belts 29, 29' are guided and with which they maintain a sealing engagement which supplements the action of the seals 26. In addition, the belts 29, 29' protect the seals 26 from fouling by slurry being filtered.

The belts 29, 29', respectively are secured to and along the opposite side edges of the web 20'. In this association, they serve as resilient reinforcing edges for the belt 20, and may also cooperate with other elements, hereinafter described, to define positive tracking and lateral spreading means for the belt.

Preferably the belts 29, 29' constitute usual commercially available drive belts having an inherent, even though somewhat limited, resilient stretchability. The web 20 is secured to each of the belts 29, 29', as by staples 29a, at suitable intervals, or in other conventional manner. Obviously, the belts 29, 29' may be replaced by other equivalent resilient edge means, capable also of guiding and reinforcing the belt web 20'. Normally the opposite ends of the web 20' will be interconnected by a zipper Z, defining a transverse seam which is liquid-impervious, and which will therefore remain uncoated and unobscured by the filter cake. Opposite end portions of this seam Z are accordingly well adapted for use as visual reference elements or indicia, such as hereinbefore mentioned.

In the present embodiment, the discharge roll 16 is employed and adapted for varying the relative lengths of the circuits through which the reference elements and their associated band portions travel. This may be accomplished either through swinging of the rotational axis of the discharge roll 16 into different angular relationships with the shaft of filter drum 11, as is well known in the prior art and exemplified for instance in the Seifried U.S. Patent No. 2,600,273 of June 10, 1952. However, we prefer for this purpose to utilize a specifically new and useful mechanism as follows:

As is shown in detail in FIGURES 6 and 7, the discharge roll 16 comprises a mid-section 30 of uniform diameter and variable diameter sections or sheaves 31 and 31', respectively. The variable diameter sections 31, 31' are preferably mounted at opposite axial ends of the fixed diameter mid-section 30 of said roll. The mid-section 30 is adapted to receive and support the main operative body portion of the filter band, between its opposed side edges, while the said side edges respectively are guided around the respective variable diameter sections 31 and 31'. The variable diameter sections are accordingly each formed around its periphery with a series of V-grooves, for mating reception of the poly-V belts 29, 29' at the opposite sides of the filter band.

Fixed internally within the roll mid-section 30 are axially spaced discs or spiders 32, 32', having centrally located bearings 33, 33', by means of which the entire discharge roll is rotatably and coaxially supported on shaft 18. The axial position of the mid-section 30 of shaft 18 is maintained by means of collars 34, 34' fixedly positioned on shaft 18, by set screws 35, 35', in rotary abutment with the relatively outer end faces of the discs 32, 32', respectively.

Since the variable diameter roll sections 31, 31' are of identical construction and operation, except for their symmetrical and relatively reversed disposition, it will suffice to describe but one of them, namely, the section 31, in detail, it being understood that the corresponding parts of roll-section 31' are designated by similar but primed reference characters.

Figure 8:
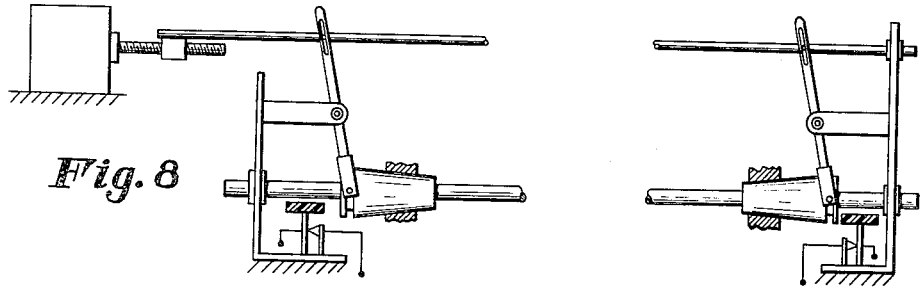
FIGURE 8 is a diagrammatic view, showing the mechanism for inversely varying the diameters of the two variable diameter roll sections.

Thus, referring to FIGURES 7 and 8, it will be seen that the variable diameter section or sheave 31 comprises a plurality of sector-shaped identical segments 36, all disposed for radial adjustment toward or away from the axis of shaft 18. In the preferred embodiment, each such section 36 is formed with a radial guide slot 37 by means of which it is supported and guides for limited radial movement on a guide block 38 fixedly supported on the end of the roll mid-section 30.

In the present embodiment, each of the guide blocks 38 is bolted at 39 to an anchor ring 40 positioned within the main section 30 of the roll, and secured therein by a retainer ring 41 and screws 42.

For resiliently urging the sheave segments radially inwardly, in a direction to reduce the sheave diameter, there is provided an endless tension spring 43, which encircles a series of pins 44 carried by the respective segments.

In order to control and increase the diameter of the sheave or variable diameter section 31, there is slidably disposed on the shaft 18 a conical plug 45, which projects coaxially through the several sheave segments 36, with its tapered or conical surface in cooperating camming engagement with the similarly tapered inner peripheral surfaces of the respective sheave segments.

Thus, axial adjustment of the plug 45 further into sheave 31, or toward the right in FIGURE 6, will result in enlarging the sheave diameter. On the other hand, a reverse or withdrawal movement of the plug 45 will permit the spring 43 to decrease the diameter of the sheave.

For adjusting the plug, there may be provided a shifting fork 46 medially fulcrumed at 47 to a bracket 48 (see FIGURE 3) fixed on the standards 19. Pins 49, at the bifurcated end of the fork 46 are slidably received in annular groove 50 of the plug, in conventional manner.

It has been found that the invention will function successfully where the diameter of but one of the sheaves is varied by making it larger or smaller than the other. However, improved results are attainable where both co-operating sheaves or sections of the discharge roll are simultaneously and inversely variable in their diameters.

Accordingly, in the preferred embodiment, the two free ends of the shifting forks 46, 46' of the two symmetrically disposed plugs 45, 45' are interconnected in parallel relationship for equal simultaneous swing adjustment, by a rigid link 51 pivotally connected at 52'', 52' to the respective shifting forks.

The link 51 thus serves as a control and interconnecting means for effecting simultaneous but relative inverse adjustments to the respective sheaves 31, 31'. Thus, the link 51 may be adjusted either manually or by suitable power means, though the latter is preferred.

A suitable power means for this purpose is exemplified by the reversible electric motor 52, carried by a platform 53 on one side of the main frame F. The drive of this motor is transmitted through a reduction gearing 54 to a threaded rotary output shaft 55. A nut 58 fixed on the shifting fork 46, is threaded on shaft 55 to translate the rotary movement thereof into swinging movement of the shifting forks 46. The connecting linkage 51 causes simultaneous and equal swinging of the two shifting forks as heretofore explained.

Associated with the relatively transversely spaced portion of the filter belt, here exemplified by its opposite edge portions, are suitable reference elements 60, 60', so arranged that their relative positions at any time in the direction belt movement may be compared, and proper corrective steps taken in the event one said reference element or indicia is lagging or advancing in its movement relative to the other. Such corrective action consists in actuation of the shifting forks 46 and 46' to simultaneously retard the movement of the forward or advanced element, and to advance the retarded element.

While the interconnected shifting forks may be manually positioned to achieve this end, this invention includes an automatic sensing means for detecting the need for corrective action, and for actuating the control mechanism to vary the diameter of the sheaves 31, 31' accordingly.

The reference elements and their cooperating sensing means may, within the broad concept of this invention, assume various forms, in addition to the magnetic type hereinafter disclosed by way of example. Various suitable and equivalent forms of reference elements and their associated sensing devices are described, for instance, in the Humphreys U.S. Patent 1,564,794, of December 8, 1925.

In the instant embodiment, the reference elements 60 and 60' and their sensing elements 61 and 61', in each case are located to be exactly abreast of each other or transversely aligned at a predetermined point during each complete circuit of the filter belt 20. However, this exact disposition is not essential, it being essential only that in the normal and proper disposition of the belt 20 around its respective drum and rollers with the belt properly tracking and in proper alignment, the reference elements 60 and 60' will register simultaneously with their respective sensing elements.

For the purpose of the present invention, the sensing elements 61 and 61' comprise conventional magnetic pickups, while the reference elements 60 and 60', respectively, may consist merely of small sections of magnetic material carried by or preferably embedded in the respective multi-V belts.

Interposed in the electrical circuit between the sensing elements 61 and 61' and the motor 52 is a suitable series of electrical relays arranged in such manner that, when the filter belt 20 is in proper alignment so that the reference elements 60 and 60' move simultaneously past their respective sensing elements, the motor 52 is not energized in either direction and the diameters of the variable sheaves 31, 31' remain unchanged. In order to permit of a certain predetermined tolerance in the rate of movement and relative positions of the opposite resilient edges of the belt, one of the reference elements 60' may be made slightly longer in the direction of belt movement than the other. The coaction of these reference elements and their respective sensing means is such that, in the event the resilient edge 29 of the belt 20, which runs over the variable diameter sheave 31, moves ahead of the other resilient edge 29' of the belt 20 and thus tends to distort the filter web 20', the reference element 60 will move correspondingly ahead of its associated element 60' and will actuate its associated sensing element 61 in advance of the actuation of sensing element 61'. This will result through action of the relay circuit in energizing the motor 52 in a direction and for a time period to somewhat increase the diameter of the sheave 31 to slightly retard the movement of that edge of the belt by lengthening its path of travel, while at the other side the diameter of sheave 31' is decreased, and the movement of the edge 29' of the belt 20 is relatively advanced, by shortening its path of travel. On the other hand, in the event the reference element 60 drops behind with respect to the movement of the reference element 60', then the sequence of actuation of the sensing elements 61 and 61' will be reversed. The relay circuit will then respond to this reversed sequence by energizing the motor 52 for a predetermined period of time to effect a slight decrease in the diameter of the variable diameter sheave 31 and thereby slightly decrease the path of travel of its associated resilient edge to thereby advance the rate of linear movement of its associated edge of belt 20, while acting through sheave 31' to increase the linear travel of its associated resilient edge of belt 20.

A suitable relay circuit for the purposes above mentioned is illustrated in the wiring diagram (FIGURE 9) as follows:

The belt regulation is controlled by motor 52 which is a single phase motor connected through a number of relay contacts to an alternating current source 70. The relay contacts are operated by a pair of relays which are controlled through an intermediate group of relays by means of the magnetic sensing devices 61 and 61' connected in a suitable electrical and electronic network. As mentioned above magnetic sensing devices 61 and 61' are in the form of coils positioned adjacent belt 20 and these devices are in turn connected to individual electronic proximity control circuits 71 and 71', respectively. The proximity control circuits are shown in schematic form in FIGURE 9A and will be subsequently described.

As depicted in FIGURE 9, the coils of relays 72 and 74 are connected to proximity control 71, while the coil of relay 75 is connected to proximity control 71'. Between the proximity control 71' and the motor 52, as viewed in FIGURE 9, are a plurality of parallel circuits including the coils of relays 76, 78, and 80 in one group and the coils of relays 84, 86, and 88 in another group. Relay 72 includes normally closed contacts 72a and 72b connected in the energizing circuits of the first and second groups of relays respectively. Relay 74 includes normally closed contact 74a and normally open contact 74b. Relay 75 includes normally open contacts 75a and 75b. Relay 76 includes normally closed contact 76a. Relay 84 includes normally closed contact 84a. Relay 86 includes three normally open contacts 86a, 86b and 86d and normally open contact 86c. Relay 78 includes normally open contacts 78a, 78b, 78c and normally closed contact 78d. Relay 80 includes normally open contact 80a. Relay 88 includes normally open contact 88a. A pair of normally closed limit switches 90 and 92 are operatively connected in the energizing circuits of the first and second groups of parallel relay circuits respectively and are physically positioned to be actuated by movement of the two shifting conical plugs 45 and 45' respectively to terminate the rotation of the motor when a predetermined limit of mechanical movement of the respective plug is achieved.

Relay 74 is a slow-release or recycling relay which will maintain contact 74a open and contact 74b closed for one half the cycle of the belt 20. Relays 76 and 84 are slow-operate relays for energizing the motor 52 for rotation in one direction and in the reverse direction respectively. Relay 72 is a control relay for controlling the rotation of motor 52 in one direction while relay 75 is a control relay for controlling the motor rotation in the reverse direction. Relay 78 is a motor reversing relay while relay 80 is a holding relay for relay 78. Relay 86 is also a motor reversing relay while relay 88 is a holding relay for relay 86.

The motor 52 includes a centrifugal switch 94 of a type commonly known in the art which may be mounted on the rotor shaft and actuated in response to the rotation of the rotor. The starting winding of the motor 52 includes a coil 96 and a capacitor 97 and a main winding 98 is employed with the starting winding. If current flows through the starting winding in one direction then the motor will start to rotate in a given direction. Similarly, if initially current flows through the starting winding in the opposite direction then the rotor will rotate in the opposite direction.

As stated previously, the length of the belt 20 is controlled in accordance with whether the magnetic elements 60 and 61' are aligned. If these elements are aligned as they pass magnetic sensing devices 61 and 61', proximity controls 71 and 71' will be simultaneously actuated and relays 72, 74 and 75 will be simultaneously actuated. Since the operation of relay 72 causes the opening of the contacts 72a and 72b, the closing of contact 75a and 75b will have no effect upon the two parallel connected groups of relays 76, 78, 80, 84, 86 and 88. If, however, magnetic element 60 passes in an area adjacent to magnetic sensing device 61 before the magnetic element 60' passes sensing device 61', relays 74 and 72 will be actuated. Relay 72 opens the normally closed contacts 72a and 72b. Relay 74 being slow-release will simultaneously open contact 74a and close contact 74b. The time delay of relay 74 is sufficient to hold the circuit of contact 74b closed for one-half of the cycle of the belt 20 in its full circuit around the filter. In essence, when only control 71 is energized no motion is imparted to the cones 45 and 45' because the control circuits are open. When reference element 60' actuates control 71' through sensing device 61', relay 75 closes contacts 75a and 75b. Since time delay relay 74 is still energized the circuit is complete to time delay relay 84 and the motor reversing relays 86 and 88 are actuated. At this point the motor 52 begins to rotate in one direction by the closing of the contacts 86a, 86b and 86d and the opening of contact 86c.

When reversing relay 86 is energized, relay 88 is also energized thereby closing contact 88a which completes the parallel energizing circuit for relays 84, 86 and 88, thus driving the motor in one direction. The motor will continue to rotate in this direction until the travel of the cone actuates limit switch 92, thus disconnecting relays 86 and 88 from the power source 70. When relays 86 and 88 are de-energized contacts 86a, 86b and 86d are opened, contact 86c is closed and contact 88a is opened de-energizing relays 84, 86 and 88 and the motor rotation is thus terminated.

In the event that the magnetic element 60' passes the sensing device 61' prior to the passage of magnetic elements 60 in the region of sensing device 61, relay 75 is actuated thereby closing contacts 75a and 75b. Current flowing through contact 75a actuates time delay relay 76 which in turn opens contacts 76a. Reversing relay 78 and holding relay 80 are also energized through the closed contact 75a. Relay 78 closes contacts 78a, b, and c and opens contact 78d, causing the motor 52 to be energized through the starting winding 94 in a sense opposite to that previously described. Accordingly, the motor rotates in the opposite direction until the cone 45' actuates limit switch 90 disconnecting the energizing circuit of relays 78 and 80. It is understood that during this rotation of the motor 52 relay 80 has maintained the relay 78 energized through contact 80a. From the foregoing explanation it is evident that the electrical circuit depicted in FIGURE 9 operates to advance one of the cones 45 or 45′ inwardly and the other outwardly relative to the roll 16 and thus control the diameters of the associated roll sections.

Figure 9A:
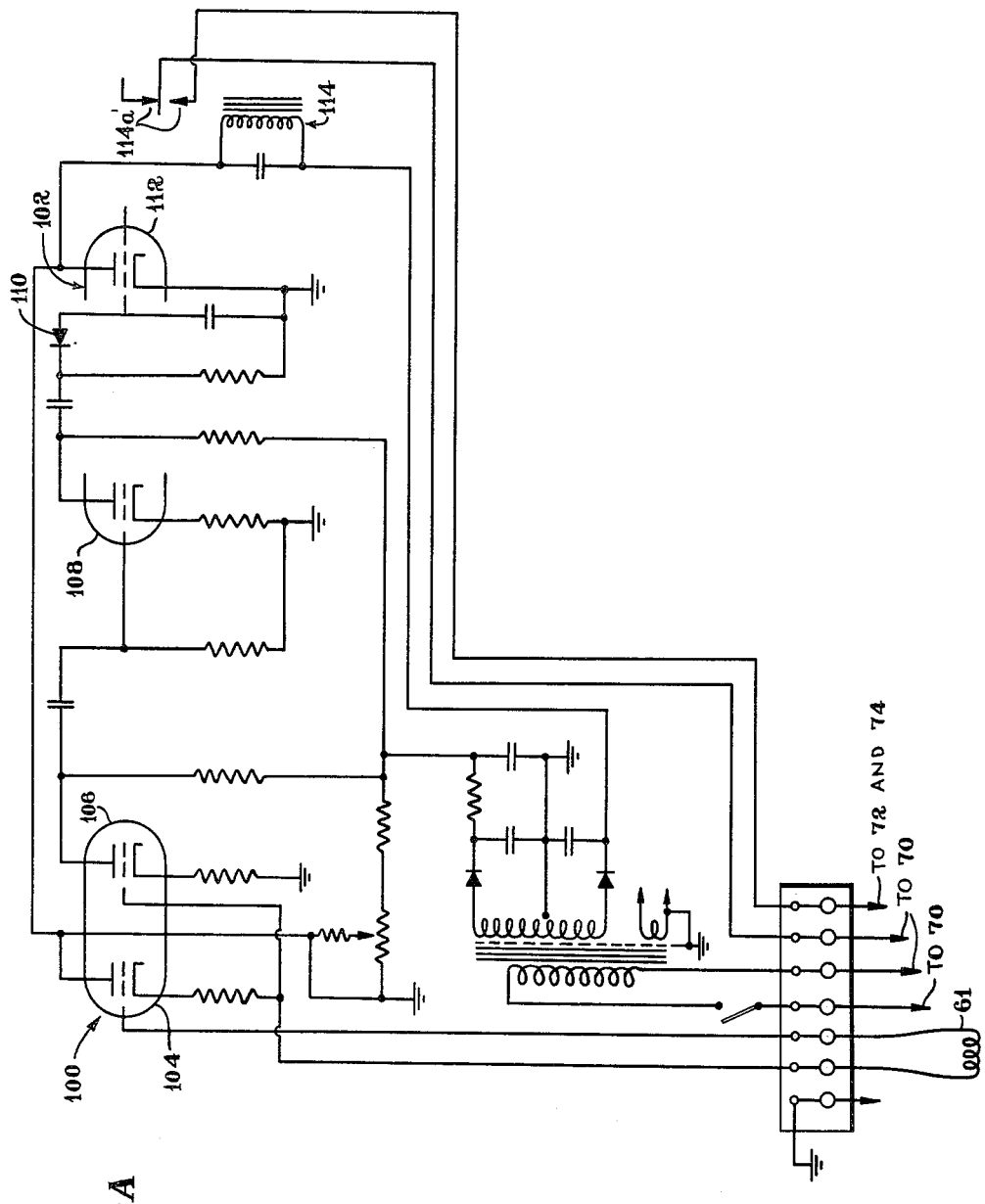

Referring now to FIGURE 9A there is depicted in schematic form an illustrative embodiment of one of the proximity controls 71 and 71′. This proximity control may be fabricated in the form of a unit and may be of the type designated model 4905 sold by the Electro Products Laboratories, Inc. of Chicago, Illinois. The embodiment depicted in FIGURE 9A includes a first dual triode tube 100 and a second dual triode tube 102. The first dual triode tube includes a first triode 104 connected to define a variation of a conventional Hartley oscillator circuit which is connected to the coil of sensing device 61 in such a manner that the coil is connected between the grid and cathode. When magnetic element 60 in the belt 20 passes in the region of the pulsing magnetic field of coil 61, variations in the oscillating current are applied to the grid of the second triode section 106. In this second triode section they are amplified and transmitted to the first triode section 108 of the second dual triode 102. These amplified signals are transmitted through a diode 110, which normally biases the second triode 112 to cut off, and causes current to flow in the anode of the second triode 112. Current flow through the second triode 112 causes the winding of relay 114 to be energized. The energization of the winding of relay 114 closes the contact 114a thus completing the circuit for energizing the relays 72 and 74. A similar operation takes place in the instance of proximity unit 71 to energize relay 75. On the basis of this explanation it is evident that the electronic proximity control circuit accurately controls the energization of the relays which in turn control the energization and direction of rotation of the motor 52.

It is understood that these electrical circuits are of a conventional nature and the foregoing explanation is merely for the purpose of completing the disclosure.

As will be clear from earlier portions hereof, it is by no means essential that the means for adjusting the filter belt comprise the discharge roll as in the heretofore described embodiment of the invention, nor in fact is it essential even that the adjusting means include one of the rolls which define the endless circuit through which the belt is guided. For instance, it is quite conceivable that a suitable adjusting means might comprise an assembly of rolls or pulleys on each side of the belt, each of which is carried by the belt itself and comprises a pair of relatively spaced rolls engaging the belt on one side, plus a further roll engaging the other side of the belt and adjustable for movement toward and away from the common axial plane of the pair of rolls first mentioned.

Figure 10:
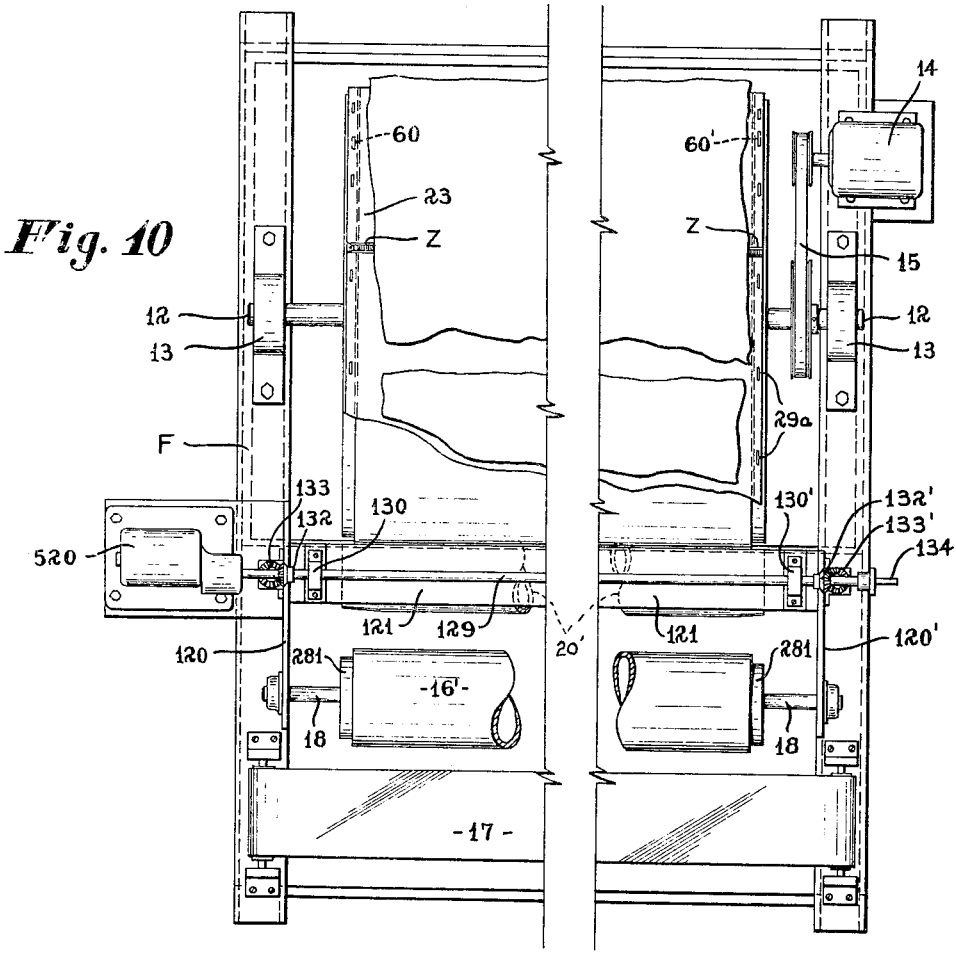
FIGURE 10 is a plan view of a somewhat modified form of the invention.

In the modified arrangement shown in FIGURE 10 and subsequent FIGURES there is shown a form of adjusting means, which in actual practice has been found to be preferable to the adjusting means of the modification heretofore described, in that it is simpler and involves less likelihood of the fouling of the various working parts than in the first embodiment. In this second embodiment, the discharge roll 160 differs from the roll 16 of the first embodiment only to the extent that it plays no part in the adjustment of the belt and, accordingly, the pulleys or sheaves 360, 360′ at its opposite ends are not of the variable diameter type but rather are of constant diameter. Aside from this, the construction and operation of the discharge roll is similar to that described in the first described embodiment.

In this modification, the belt adjustment is attained through tilting of the return roll 20′ about a point midway of its length in a generally vertical plane transverse to the portion of the filter belt which it engages. Thus, by raising one end of the roll 20′, while simultaneously lowering the other end, the length of the endless circuit of the belt edge around said first end will be increased, while the length of the endless circuit traversed by the belt around the second end will be relatively decreased. Except insofar as the individual elements of this second modification depart from the structure and arrangement of the first modification, they are designated by similar reference characters, it being understood that, aside from the modified structure here specifically described, the construction and operation will remain the same as in the first embodiment.

There are provided on opposite sides of the frame F adjacent the filter drum 13, a pair of upwardly projecting standards 120 and 120′ on opposite sides, respectively, of the frame. The shaft 121 of the return roll 20′ projects and is carried for movement through vertical slots s and s′ in the standards 120 and is rotatably supported in bearings 122, 122′ respectively. These bearings are of the self-aligning type, whereby they may be disposed relatively in slightly varying angular relationships to the shaft 121. The bearings 122, 122′ respectively are carried by slides 123, 123′, which are respectively guided for generally vertical adjustment in guide means 124, 124′ on the outer or relatively remote faces of the standards 120, 120′. The said slides, together with the means for adjusting them, are of identical construction, so that it will suffice to describe in detail only one of them, namely, the slide 123, it being understood that the slide 123′ and its several parts will be of similar construction and operation and that the several parts operatively associated with it will be designated by similar but primed reference characters. For raising and lowering the slide 123, there is provided a threaded shaft 125, which is rotatably supported in bearings 126 and 127 on the standard 120 for rotation about a substantially vertical axis. The lower threaded end of the shaft 125 is operatively disposed through and in threaded engagement with a nut 128 fixed on the slide 123.

The threaded shafts 125, 125′, for adjusting the opposite ends of the return roll 20′ are interconnected in such manner as to cause relatively equal but opposite movement or, in other words, relatively inverse adjustment of the respective ends of the return roll to achieve the same ultimate function as the interconnected variable diameter pulleys in the first embodiment.

Thus, a cross-shaft 129 rotatably supported through bearings 130 on cross frame 131 (supported between the two standards 120 and 120′) has keyed on its opposite ends the bevel gears 132, 132′. The bevel gear 132 meshes with a bevel gear 133 secured on the upper end of the shaft 125, while the bevel gear 132′ meshes with bevel gear 133′ secured on the upper end of its respective shaft 125′. Since the bevel gears 132, 132′ are relatively symmetrically disposed, it will be seen that they will transmit rotation to their respective vertical shafts 125 and 125′ to an equal extent but in opposite directions. Thus, the threads on these shafts 125, 125′ may be of the same hand, but the rotation of the shafts in opposite directions will cause relatively inverse vertical adjustment of the opposite ends of the return roll.

Such adjustment may be produced either manually, based on visual observation of the reference elements or indicia on the filter belt 23, or may be produced automatically. For manually making the desired adjustment, there may be provided simply a usual hand crank 134 fixed to one end of the cross-shaft 129. By visually observing either the relative positions of the reference elements 60, 60′ of the filter belt or of the opposite end portions of the transverse seam or zipper connection Z thereon, and noting which side of the belt may become relatively advanced or retarded in its movement, the crank 134 may be manually actuated to correct this by relatively lengthening the one edge of the belt and the path traversed thereby while relatively shortening the other side edge and the path traversed by it.

If it is desired to automatically actuate the control mechanism, a reversing motor 520 such as is employed in the first embodiment of the invention, may be coupled through a reducing gearing directly to the other end of the cross-shaft 129. The means in such case for automatically controlling the actuation of the motor will include the reference elements 60, 60' and together with a sensing means and relay circuit in a form identical to that hereinbefore described.

It will thus be seen that, in accordance with the invention, an elastically stretchable filter belt may be maintained in a relatively wrinkle-free condition and in proper alignment by contracting or expanding its opposite edges or other relatively transverse portions as necessary to relatively retard or advance them for the purpose of retaining them substantially abreast of each other with a relatively small degree of tolerance.

Figure 11:
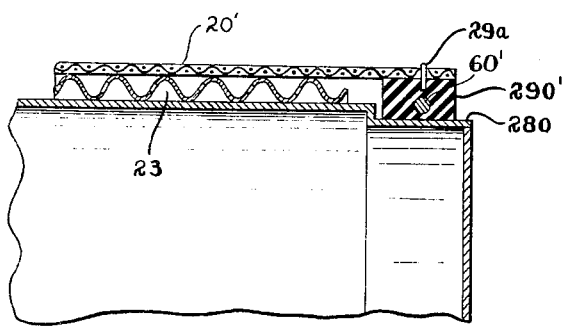
FIGURE 11 is a fragmentary diametrical section through a portion of the filter drum and belt, showing certain modifications of the structure shown in corresponding FIGURE 5.
Figure 12:
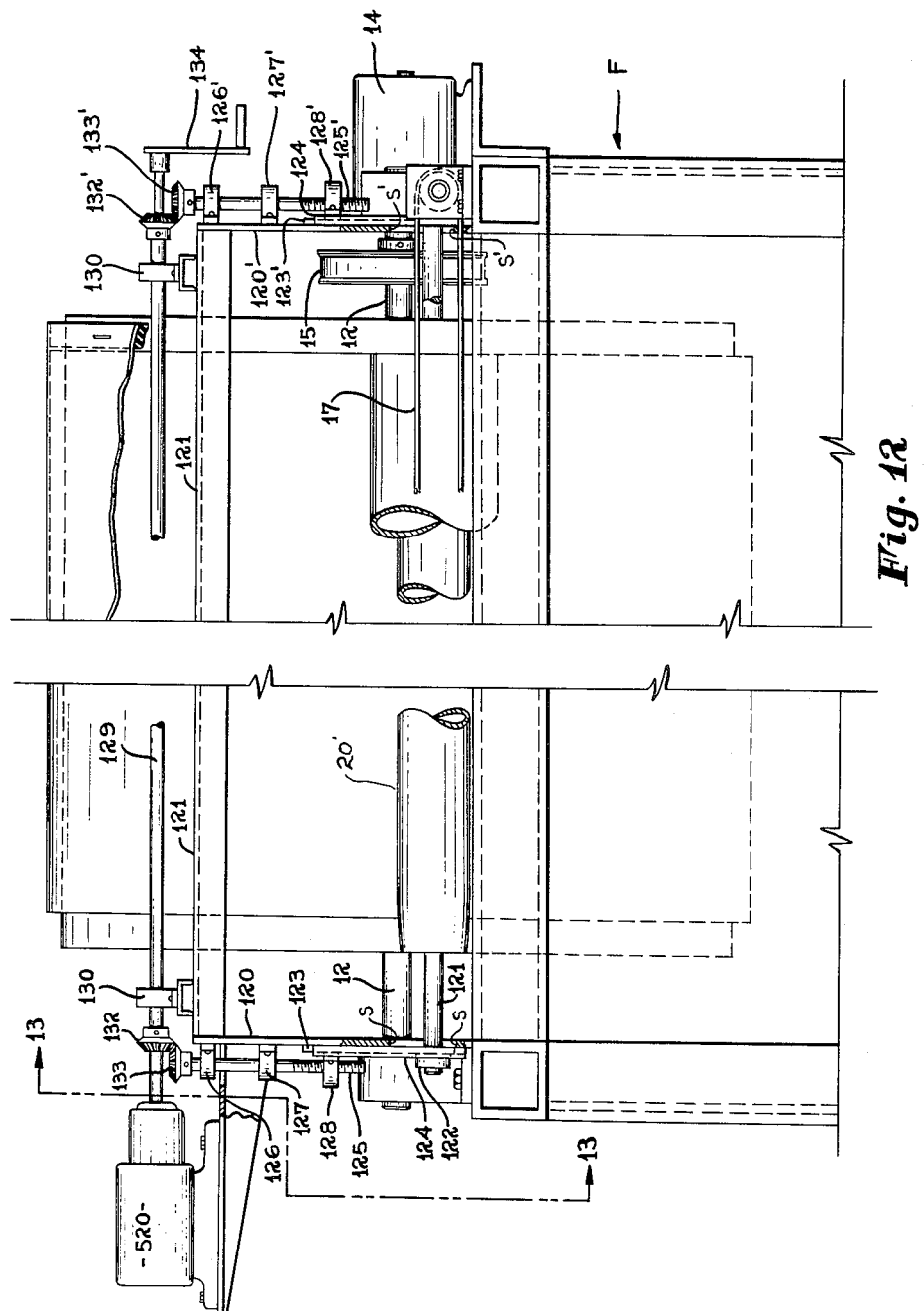
FIGURE 12 is an end elevation of the structure shown in FIGURE 10, as seen from the discharge end of the filter unit.
Figure 13:
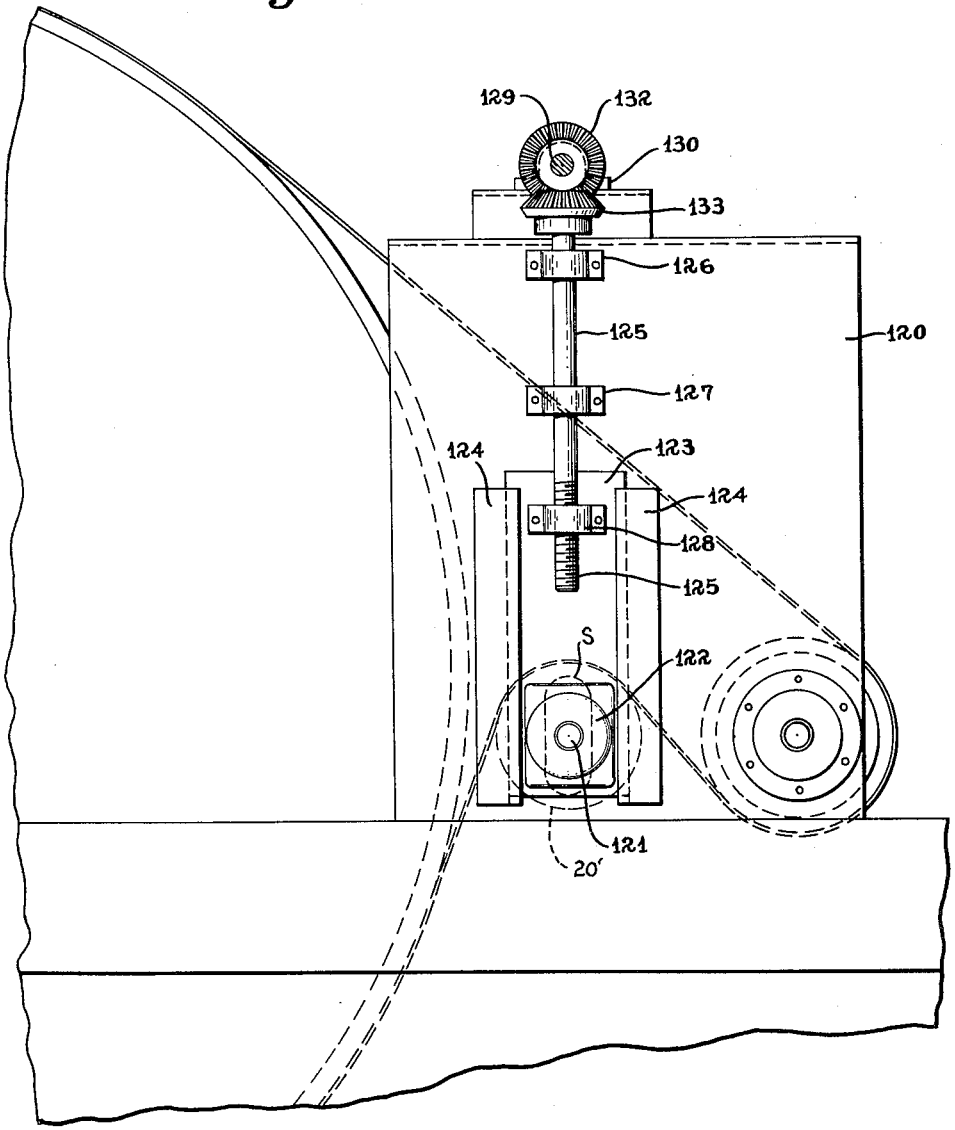
FIGURE 13 is a side elevation showing certain details of the roll-adjusting structure.

In FIGURE 11 of the accompanying drawings there is shown a structure in which the form of the filter belt is slightly modified as employed in the second embodiment in the invention. To this end the fabric web portion 20' of the filter belt is supported at its opposite edges by stretchable belts 290 and 290', respectively, secured thereto by staples 29a as in the preferred embodiment. However in this modification the inner faces of the respective belts, instead of being of poly V duration as in the preferred embodiment, are smooth for the purpose of making a flush sealing engagement with correspondingly smooth annular surfaces 280 and 281 at the opposite ends of the filter drum 11 and the discharge roll 16'. In this structure the sealing means 26, 27 of the first-described embodiment shown in FIGURE 5 is omitted as unnecessary.

It will be apparent from the foregoing that the invention is capable of various other obvious embodiments than those shown and described herein and similarly its different elements may assume varying forms, all without departing from the scope of the invention as defined in the accompanying claims.

Having thus described our invention, we claim:

1. A continuous belt type filter unit comprising a pair of relatively spaced parallel rolls, means rotatably supporting said rolls, a filter belt composed of a flexible porous and stretchable filter web having resilient longitudinally stretchable portions transversely spaced from each other, disposed for movement in an endless circuit around said rolls, drive means for imparting rotation to one of said rolls, one of said rolls including an axial section of variable diameter relative to another axial section of said last mentioned roll, said sections engaging said respective resilient portions of the belt, mechanism operatively connected to said variable diameter section for varying the diameter thereof, a reference element carried by said belt for movement with said belt around said variable diameter section, a further reference element carried by said belt at a location transversely displaced from said first reference element, sensing means supported adjacent the belt for actuation by movement therepast of the respective reference elements, and power means operatively interconnected between said sensing means and said diameter varying mechanism for increasing or decreasing the diameter of said variable diameter section in accordance with the sequence in which said sensing means are respectively actuated.

2. A continuous belt type filter unit comprising a filter drum rotatable about a horizontal axis, a roller, means supporting said roller for rotation about an axis generally parallel to and spaced from the drum axis, a filter belt composed of a longitudinally stretchable porous filter web having resiliently longitudinally stretchable edges, guided for movement in an endless circuit around said drum and said roll, adjusting means providing for adjustment of said roller to vary the lengths of the paths traversed by the said edges of said belt transversely spaced from each other in completing said circuit, reference elements carried by the respective belt edges at predetermined points along their respective lengths, sensing means supported adjacent the belt for actuation by movement therepast of the respective reference elements, and power means operatively interconnected between said sensing means and said adjusting means for varying the length of one said path relative to the other in accordance with the sequence in which said sensing means are respectively actuated.

3. A continuous belt type filter unit comprising a filter drum rotatable about a horizontal axis, a roll and means supporting same for rotation about an axis generally parallel to and spaced from the drum axis, a resiliently stretchable filter belt guided for movement around said drum and said roll in an endless circuit, means providing for adjustment of said roll to vary the lengths of circuit traversed by different portions of said belt transversely spaced from each other with respect to the belt movement, and reference elements carried by the respective portions to facilitate the observing of said relative displacements, said roll including a pair of relatively axially spaced sections of variable diameter coincident with the respective edges of the belt, and mechanism operatively connected to said reference elements and to the said sections for simultaneously and inversely varying their diameters under the control of said sensing elements.

4. A filter unit as defined in claim 3, including power means energized by said reference elements for actuating said mechanism.

5. A filter unit as defined in claim 3, in which said roll includes a main section of fixed diameter, said variable diameter sections being carried at opposite axial ends of said main section, flexible resiliently stretchable guiding and reinforcing belts being secured along opposite edges of said belt and guided around the respective sections, whereby to maintain the said belt laterally extended and to guide its said edges in predetermined paths.

6. A continuous belt type filter unit comprising a filter drum rotatable about a horizontal axis, a roll supported for rotation about a horizontal axis parallel to and spaced from the drum axis, a filter belt composed of a stretchable porous filter web having resiliently stretchable edges guided for movement in an endless circuit around said drum and said roll, said drum and said roll respectively including sheaves for receiving and guiding the said edges in predetermined paths of movement, said edges and sheaves cooperating to maintain said belt laterally spread and accurately axially positioned on said drum and said roll, sensing means for detecting relative displacement between said edges in the direction of said belt movement and means controlled by said sensing means for selectively causing movement of one said resilient edges relative to the other around said endless circuit in a direction to counteract said relative displacement.

7. A continuous belt type filter unit comprising a filter drum rotatable about a horizontal axis, a roll and means supporting same for rotation about an axis substantially parallel to and spaced from said horizontal axis, a resiliently stretchable filter belt guided for movement in an endless circuit around said drum and said roll, means normally driving the belt at a constant velocity through said endless circuit, adjustable means connected to said belt and operable during its movement for longitudinally stretching relatively transversely spaced portions of said belt to relatively change the lengths of said portions and the times required by them for completion of said endless circuit, a reference element fixed on each said portion of the belt, sensing means for detecting relative displacement between said reference elements in the direction of movement of the said belt along its circuit, and power means operatively connected between said sensing means and said adjustable means, and controlled by said sensing means to vary the setting of said adjustable means as required to counteract said relative displacement.

8. A continuous belt type filter unit, as defined in claim 7, wherein said transversely spaced portions respectively comprise the side edges of the belt.

9. A continuous belt type filter unit as defined in claim 7 wherein said belt comprises an endless and stretchable, but substantially inelastic web of porous fabric material, and endless resiliently stretchable belts secured along the opposite side edges of said web, said resiliently stretchable belts comprising said transversely spaced portions.

10. The process of maintaining a resiliently stretchable flexible filter belt in substantially wrinkle-free condition during its movement through an endless circuit around a plurality of relatively spaced rotary rolls, comprising the steps of confining the opposite side edges of the belt to movement in predetermined paths spaced apart a distance equal to the belt width, to thereby maintain the belt laterally extended, observing any relative displacement of said side edges in the direction of the belt movement through its said circuit, and varying the length of the path traversed by one said side edge to counteract said relative displacement.

11. A continuous belt type filter unit comprising a filter drum rotatable about a horizontal axis, a roll supported for rotation about a horizontal axis parallel to and spaced from the drum axis, a filter belt composed of a stretchable porous filter web having resiliently stretchable edges guided for movement in an endless circuit around said drum and said roll, said drum and said roll respectively including sheaves for receiving and guiding the said edges in predetermined paths of movement and preventing lateral displacement of said edges, said edges and sheaves cooperating to maintain said belt laterally spread and accurately axially positioned on said drum and said roll, a reference element fixed on each said edge of the belt, sensing means for detecting any relative displacement between the said reference elements in the direction of their movement with the belt through its endless support and means controlled by said sensing means for relatively varying the lengths of the respective edges to counteract said relative displacement.

References Cited in the file of this patent

UNITED STATES PATENTS

| | | |
|---|---|---|
| 594,415 | Morrison | Nov. 30, 1897 |
| 877,631 | Clark | Jan. 28, 1908 |
| 1,154,731 | Saunders | Sept. 28, 1915 |
| 2,044,640 | Schuster | June 16, 1936 |
| 2,963,161 | Holland | Dec. 6, 1960 |

FOREIGN PATENTS

| | | |
|---|---|---|
| 210,825 | Australia | Oct. 11, 1957 |